United States Patent [19]

Flowers

[11] Patent Number: 5,481,318
[45] Date of Patent: Jan. 2, 1996

[54] TELEVISION RECEIVER WITH ADDITIONAL DISPLAY OF CHARACTERS

[75] Inventor: Howard P. Flowers, Enfield, Great Britain

[73] Assignee: Ferguson Limited, United Kingdom

[21] Appl. No.: 344,796

[22] Filed: Nov. 23, 1994

Related U.S. Application Data

[63] Continuation of Ser. No. 111,229, Aug. 24, 1993, abandoned, which is a continuation of Ser. No. 669,067, Mar. 12, 1991, abandoned.

[30] Foreign Application Priority Data

Mar. 27, 1990 [GB] United Kingdom .................. 9006776

[51] Int. Cl.$^6$ .................................................. H04N 5/262
[52] U.S. Cl. ............................................. 348/686; 348/589
[58] Field of Search ................................ 348/686, 689, 348/687, 589, 678; H04N 5/262, 5/272–5/278, 5/14

[56] References Cited

U.S. PATENT DOCUMENTS

5,031,043  7/1991  Rocco et al. ............................. 358/183

FOREIGN PATENT DOCUMENTS

| | | |
|---|---|---|
| 0108851 | 5/1984 | European Pat. Off. . |
| 0129648 | 1/1985 | European Pat. Off. . |
| 486129 | 5/1992 | European Pat. Off. ......... H04N 5/78 |
| 106477 | 8/1924 | Japan .............................. H04N 5/22 |
| 0091868 | 10/1983 | Japan .............................. H04N 5/14 |
| 2260982 | 10/1990 | Japan ............................. H04N 5/278 |
| 2-266771 | 10/1990 | Japan ............................. H04N 5/278 |
| 1554663 | 10/1979 | United Kingdom . |
| 2078049 | 12/1981 | United Kingdom . |

OTHER PUBLICATIONS

IEEE Standard Dictionary of Electrical and Electronics Terms, Library of Congress Catalog Number 84–081283 Copyright 1984, pp. 188 and 106.

*Primary Examiner*—James J. Groody
*Assistant Examiner*—Glenton B. Burgess
*Attorney, Agent, or Firm*—Joseph S. Tripoli; Peter M. Emanuel; Thomas F. Lenihan

[57] ABSTRACT

A television receiver displays characters within a box on a display screen wherein the normal picture is also displayed within the box. Circuitry in the receiver permits a display of the normal picture within the box for viewing the total picture while achieving good visibility of the characters within the box. The circuitry provided reduces the contrast of the picture within the box in relation to the contrast outside the box.

8 Claims, 1 Drawing Sheet

TELEVISION RECEIVER WITH ADDITIONAL DISPLAY OF CHARACTERS

This is a continuation of application Ser. No. 08/111,229, filed Aug. 24, 1993, now abandoned, which is a continuation of Ser. No. 07/669,067, filed Mar. 12, 1991, now abandoned.

FIELD OF THE INVENTION

The invention relates to a television receiver with additional display of characters within a box wherein the normal picture is displayed also within said box.

BACKGROUND OF THE INVENTION

According to prior art a television receiver displaying a normal picture on the screen of the picture tube includes means for additionally displaying characters on a part of the screen (i.e., a minor portion of the screen) within the normal picture (i.e., the major portion of the screen). Said characters may include an explanation of the normal picture just displayed. They may include any news or special hints for the controlling or tuning or adjusting of the receiver.

The characters in form of symbols, letters or numbers may be merely inserted into the picture so that only the characters themselves occupy a part of the picture area. In other cases a so-called box is provided within the picture area and the characters appear within said box. The box forming a background for the characters may be displayed in black or any other color.

If the characters are located within a box having a background with uniform color a good visibility of the characters is achieved as the characters within the box are not surrounded by the normal picture. On the other hand a part of the normal picture is lost and cannot be regarded. This is a disadvantage especially in cases where the box occupies a relative large area of the picture.

Another solution consists of displaying the normal picture also within the box. In this case the normal picture can be seen within the area occupied by the box except the small areas of the characters. However, in this case it becomes difficult to read the characters as they are surrounded by the normal picture. Said two demands for display of nearly the full picture also in the box on the one hand and a good visibility of the characters on the other hand therefore seem to be contrary and not possible simultaneously.

SUMMARY OF THE INVENTION

It is an object of the invention to modify the receiver in such a way that said two requirements for display of the full picture and good visibility of the characters are achieved simultaneously.

According to the invention means are provided for reducing the contrast of the picture within the box in relation to the contrast outside the box.

It was found that at reduced contrast the picture within the box is still discernible. On the other hand the reduced contrast within the box permits a good visibility of the characters which is not disturbed by the picture forming the background within the box.

According to one embodiment of the invention the amplification of the picture signal fed to the picture tube is reduced during display of the box. Likewise it is possible to amplitude limit said picture signal at a predetermined threshold, that means to clip the signal. In another form there is used a combination of said two methods that means reducing the amplification above a predetermined threshold.

Said means for handling the signal may be arranged within the path of the RGB-signals, within the path of the composite video signal (CVBS) or within the path of the luminance signal and/or within the path of the demodulated color difference signals or color component signals. The solution used depends upon the circuitry used in the television receiver.

Preferably the means for reducing the contrast are adjustable in order to adapt said reduction to the special requirements or individual impressions of the viewer.

BRIEF DESCRIPTION OF THE DRAWING

In order that the invention may be more readily understood, a description is now given by way of example only, reference being made to the accompanying drawing. Within the drawing

DESCRIPTION OF THE EMBODIMENT

Figure 1:
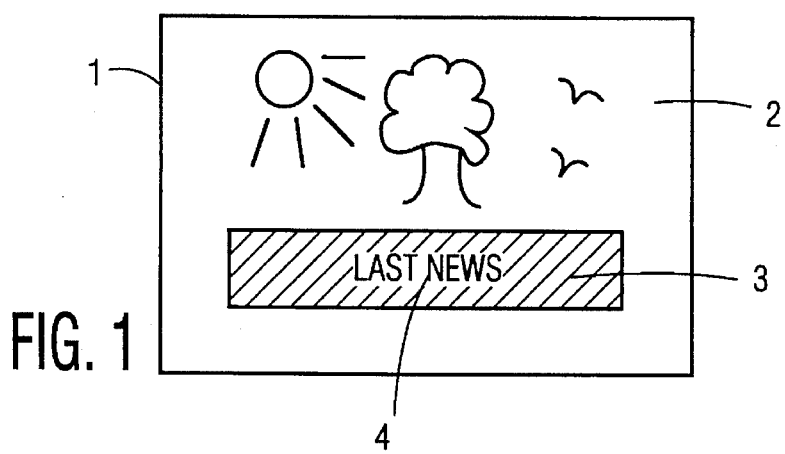
FIG. 1 shows the screen together with the box and the characters.

FIG. 1 shows a picture screen 1 on which a normal picture 2 is displayed. Within the picture 2 a box 3 of rectangular form is displayed. Within the box 3 characters 4 are displayed including additional informations for the viewer. The normal picture 2 is also displayed within the area of box 3 except the small areas of the characters 4. The picture 2 outside the box 3 as well as the characters 4 are not modified compared with prior art. However, the contrast of the normal picture 2 within the box 3 is reduced with respect to the contrast of the picture 2 outside the box. Therefore, the picture 2 can also be regarded (i.e., viewed) within the area of box 3 whereas the readibility of the characters 4 is not decreased.

Figure 2:
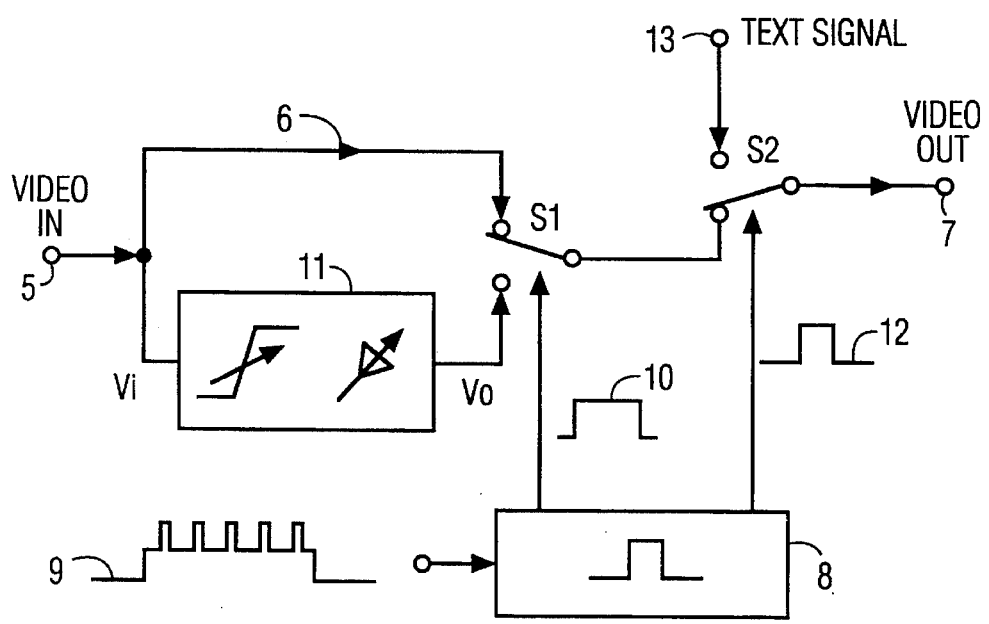
FIG. 2 shows a circuit diagram of the invention and FIGS. 3, 4, and 5 show different characteristics of the circuit shown in FIG. 2.

FIG. 2 shows the circuit for producing a signal for a display according to FIG. 1. During the display of the normal picture 2 outside the box 3, the video signal is fed from a terminal 5 to an output terminal 7 via a lead 6, switches S1 and S2 being in the positions as shown. During this interval the video signal is not modified by the circuit designated 11.

With respect to the video signal for display within box 3, during several video lines or during special parts of several video lines switch S1 is switched to its lower position in response to a pulse 10. Now the video signal from terminal 5 is fed via circuit 11 which reduces the contrast of said signal. Instead of original video signal at terminal 5 now the signal Vo with reduced contrast is fed via the lower positions of switches S1 and S2 to terminal 7 for display on the screen of the tube.

During the display of the characters 4 within box 3 switch S2 is switched in response to a pulse 12 to its upper position. Now the video signal from terminal 5 is completely switched off and replaced by the text signal from terminal 13 representing characters 4.

Figures 3, 4, 5:
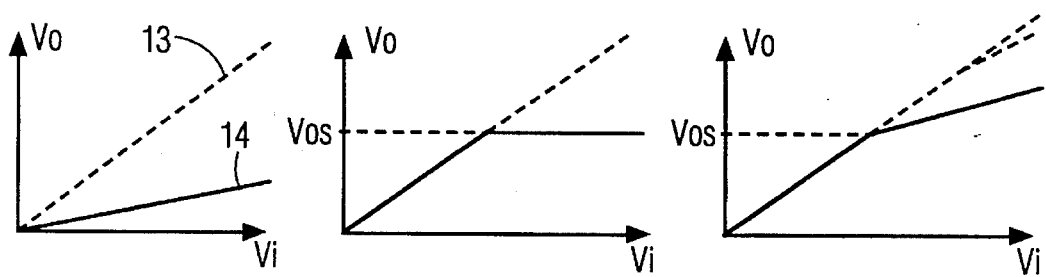

FIGS. 3, 4, and 5 show different possible characteristics of circuit 11.

According to FIG. 3 the signal path represented by lead 6 normally has an amplification according to curve 13. The circuit 11, however, has an amplification according to curve 14, so that the amplitude of the signal Vo compared with the signal Vi is reduced for reducing the contrast within box 3.

In FIG. 4 the amplification of the signal is not changed below a threshold value Vos. Above Vos however the signal Vi is amplitude limited or clipped so that the amplitude of video signal Vo used for display in box 3 is limited at a value Vos.

FIG. 5 shows the combination of the solutions according to FIGS. 3, and 4. Up to Vos amplification is unchanged whereas above Vos the signal is not amplitude limited but provided with a lower amplification factor represented by the different lines shown.

The modification of signal Vi within circuit 11 may be adjustable to different values of amplification or to different threshold values shown in FIGS. 4, and 5 as illustrated by the symbols within circuit 11. Circuit 11 can be implemented by analogue or digital means or a combination of analogue and digital means. This adjustment can be made by a remote control unit, or be preset or be fixed.

These conditions can be set up by physical components or by digital means.

Digital means can include read only memory, non-volatile memory or read-write memory.

The storage associated with digital means may be external to circuit 11.

I claim:

1. A television receiver, comprising:

means for processing video signals, said video signal processing means developing one of a first video signal exhibiting a first substantially linear contrast range, and a second video signal exhibiting a second substantially linear contrast range, in response to a control signal, said second contrast range being reduced with respect to said first contrast range:

a display screen including a box on said display screen, wherein a video image is displayed outside and inside said box;

control means for generating said control signal for causing said video signal processing means to develop said first video signal for display of said video image outside said box, and to develop said second video signal for display of said video image within said box; and means for producing a combined video signal, said combined video signal comprising a text signal representing characters for display and said second video signal;

said characters exhibiting a contrast range which is not reduced, in order to produce a display having easily viewable characters and a background of active video.

2. The receiver according to claim 1, wherein said video image is conveyed to said display means as RGB signals and said video signal processing means are arranged within the paths of said RGB signals.

3. The receiver according to claim 1, wherein said video image is processed as a composite video signal and said video signal processing means are arranged within the path of said composite video signal.

4. The receiver according to claim 1, wherein said receiver processes luminance and chrominance component signals of said video image and said video signal processing means are arranged within the path of said luminance component signal.

5. The receiver according to claim 1, wherein said receiver includes means for demodulating color difference signals for reproducing said video image, and said video signal processing means are arranged within the path of said demodulated color difference signals.

6. The receiver according to claim 1, wherein said video image is processed as a composite video signal and said video signal processing means are arranged within the path of said composite video signal.

7. A television receiver, comprising:

means for processing video signals for display on a display screen, said video signal processing means developing one of a first video signal exhibiting a first substantially linear contrast range, and a second video signal exhibiting a second substantially linear contrast range in response to a control signal, said second contrast range being reduced with respect to said first contrast range:

control means for generating said control signal for causing said video signal processing means to develop said first video signal for display of a video image outside a minor area of said display screen, and to develop said second video signal for display of said video image within said minor area; and means for producing a combined video signal, said combined video signal comprising a text signal representing characters for display and said second video signal;

said characters for display exhibiting a contrast range which is not reduced in order to produce a display having easily viewable characters and a background of active video.

8. A television receiver, comprising:

a video circuit for developing video signals for display on a display screen, said video circuit having selectable first and second amplification rates, said first amplification rate being substantially unity and exhibiting a first substantially linear contrast range, said second amplification rate being less than unity and exhibiting a second substantially linear contrast range said second substantially linear contrast range being reduced with respect to said first substantially linear contrast range;

said video signals when displayed on said display screen produce a display including a box on said display screen, a video image being displayed outside and inside said box;

control means for causing said video circuit to select said first amplification rate for video signals displayed outside said box, and to select said second amplification rate for video signals displayed inside said box; and means for producing a combined video signal, said combined video signal comprising a text signal representing characters for display and said video signals amplified at said second amplification rate;

said characters displayed within said box exhibiting a contrast range which is not reduced in order to produce a display within said box having easily viewable characters and a background of active video.

* * * * *

UNITED STATES PATENT AND TRADEMARK OFFICE
CERTIFICATE OF CORRECTION

PATENT NO.  :   5,481,318
DATED       :   Jan. 2, 1996
INVENTOR(S) :   Flowers

It is certified that error appears in the above-identified patent and that said Letters Patent is hereby corrected as shown below:

On Title Sheet [56] References Cited, FOREIGN PATENT DOCUMENTS that portion reading "0091868 10/1983 Japan ....... H04N 5/14" should read -- 0091868 10/1983 European Pat. Off. ...... H04N 5/14 --

Signed and Sealed this

Fourteenth Day of May, 1996

Attest:

BRUCE LEHMAN

Attesting Officer

Commissioner of Patents and Trademarks